United States Patent
Obaidi

(10) Patent No.: US 11,683,218 B2
(45) Date of Patent: *Jun. 20, 2023

(54) COMPROMISED NETWORK NODE DETECTION SYSTEM

(71) Applicant: T-Mobile USA, Inc., Bellevue, WA (US)

(72) Inventor: Ahmad Arash Obaidi, San Ramon, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,199

(22) Filed: Mar. 1, 2022

(65) Prior Publication Data

US 2022/0271991 A1    Aug. 25, 2022

Related U.S. Application Data

(63) Continuation of application No. 16/020,743, filed on Jun. 27, 2018, now Pat. No. 11,271,801.

(51) Int. Cl.
*H04L 41/0654* (2022.01)
*G06N 20/00* (2019.01)
(Continued)

(52) U.S. Cl.
CPC ...... *H04L 41/0672* (2013.01); *G06F 9/45558* (2013.01); *G06N 20/00* (2019.01);
(Continued)

(58) Field of Classification Search
CPC ............. H04L 41/0672; H04L 63/1425; G06F 9/45558
See application file for complete search history.

(56) References Cited

U.S. PATENT DOCUMENTS 8,745,734 B1 * 6/2014 Brandwine ......... H04L 63/1408
726/25
9,009,834 B1    4/2015 Ren et al.
(Continued)

OTHER PUBLICATIONS

Han et al., "On the Resiliency of Virtual Network Functions", IEEE Communications Magazine, vol. 55, No. 7, pp. 152-157, Jul. 14, 2017.

(Continued)

*Primary Examiner* — Douglas B Blair
(74) *Attorney, Agent, or Firm* — Knobbe Martens Olson & Bear LLP

(57) ABSTRACT

An improved core network that includes a network resilience system that can detect network function virtualization (NFV)-implemented nodes that have been compromised and/or that are no longer operational, remove such nodes from the virtual network environment, and restart the removed nodes in a last-known good state is described herein. For example, the network resilience system can use health status messages provided by nodes, intrusion data provided by intrusion detection agents running on nodes, and/or operational data provided by the nodes as applied to machine learning models to identify nodes that may be compromised and/or non-operational. Once identified, the network resilience system can delete these nodes and restart or restore the nodes using the last-known good state.

20 Claims, 5 Drawing Sheets

(51) Int. Cl.
*G06F 9/455* (2018.01)
*H04L 9/40* (2022.01)

(52) U.S. Cl.
CPC ............... *H04L 63/1425* (2013.01); *G06F 2009/45575* (2013.01); *G06F 2009/45591* (2013.01); *G06F 2009/45595* (2013.01)

(56) References Cited

U.S. PATENT DOCUMENTS

| | | | |
|---|---|---|---|
| 9,740,577 B1 | 8/2017 | Chakraborty et al. | |
| 10,572,346 B1 | 2/2020 | Sharma et al. | |
| 11,271,801 B2* | 3/2022 | Obaidi | H04L 43/16 |
| 2009/0169017 A1 | 7/2009 | Smith et al. | |
| 2009/0241109 A1* | 9/2009 | Vandegrift | G06F 9/445 |
| | | | 718/1 |
| 2011/0004935 A1 | 1/2011 | Moffie et al. | |
| 2012/0030670 A1 | 2/2012 | Vijay et al. | |
| 2013/0019240 A1 | 1/2013 | Tsirkin et al. | |
| 2014/0095821 A1* | 4/2014 | Yang | G06F 3/0619 |
| | | | 711/162 |
| 2014/0201732 A1 | 7/2014 | Haag et al. | |
| 2014/0230077 A1* | 8/2014 | Muff | G06F 9/45558 |
| | | | 726/30 |
| 2015/0074362 A1* | 3/2015 | Mohl | G06F 3/0619 |
| | | | 711/162 |
| 2015/0082302 A1 | 3/2015 | Cheng et al. | |
| 2015/0127783 A1 | 5/2015 | Lissack | |
| 2015/0301902 A1* | 10/2015 | Timashev | G06F 11/1458 |
| | | | 714/19 |
| 2015/0358292 A1 | 12/2015 | Karale | |
| 2016/0055064 A1 | 2/2016 | Gostev | |
| 2016/0062746 A1 | 3/2016 | Ciosi et al. | |
| 2016/0234108 A1 | 8/2016 | McAleer | |
| 2016/0321352 A1 | 11/2016 | Patel et al. | |
| 2016/0328251 A1 | 11/2016 | Bernstein et al. | |
| 2016/0342437 A1 | 11/2016 | Khemani et al. | |
| 2017/0222815 A1 | 8/2017 | Meriac et al. | |
| 2018/0013722 A1 | 1/2018 | Enos | |
| 2018/0330081 A1* | 11/2018 | Hua | G06F 9/4812 |
| 2020/0007385 A1 | 1/2020 | Obaidi | |
| 2020/0119993 A1 | 4/2020 | Gandhewar et al. | |

OTHER PUBLICATIONS

International Search Report and Written Opinion for International Application No. PCT/US2019/037109, Notification dated Sep. 16, 2019.

* cited by examiner

COMPROMISED NETWORK NODE DETECTION SYSTEM

CROSS-REFERENCE TO RELATED APPLICATIONS

This application is a continuation of U.S. patent application Ser. No. 16/020,743, entitled "COMPROMISED NETWORK NODE DETECTION SYSTEM" and filed on Jun. 27, 2018, which is hereby incorporated by reference herein in its entirety.

BACKGROUND

A core network (also known as network core or backbone network) is the central part of a telecommunications network that provides various services to telecommunication devices, often referred to as user equipment ("UE"), that are connected by access network(s) of the telecommunications network. Typically, a core network includes high capacity communication facilities that connect primary nodes, and provides paths for the exchange of information between different sub-networks.

Generally, primary nodes and other nodes in the core network are implemented in specific hardware manufactured and/or provided by various entities. In particular, the functionality of one specific type of node may be implemented in hardware provided by a first entity, and the functionality of another specific type of node may be implemented in hardware provided by a different entity. While some or all of the nodes may be compatible with each other, the various entities may use their own proprietary protocols, hardware, and/or software to implement the nodes. Thus, the processes for deploying, accessing, and/or configuring various nodes may be different.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
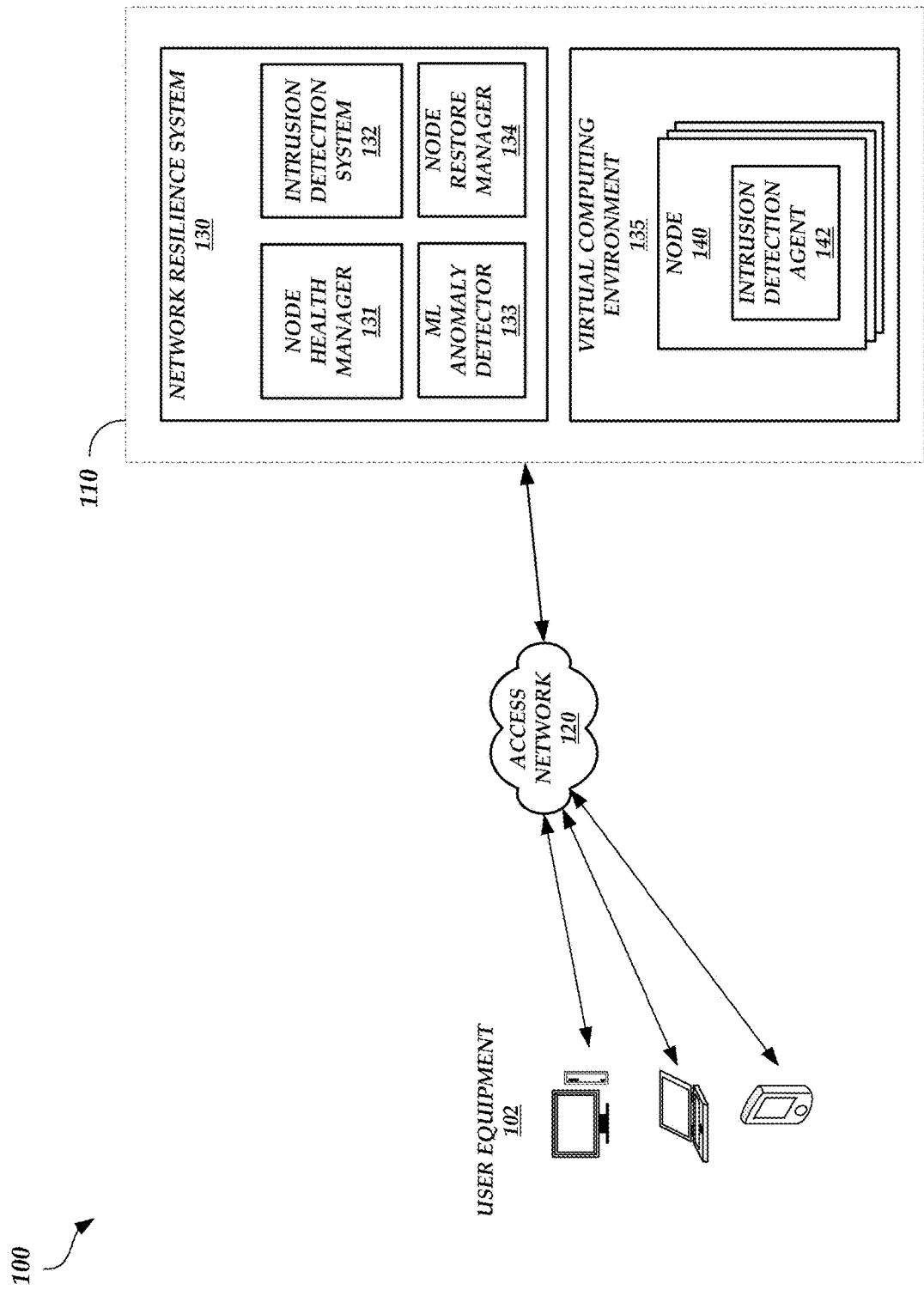
FIG. 1 is a block diagram of an illustrative compromised node detection environment in which a network resilience system monitors various nodes implemented in a virtual computing environment within a core network, detecting when such nodes may be compromised and taking corrective action.

As described above, primary nodes and other nodes in a core network generally are implemented in specific hardware manufactured and/or provided by various entities. However, while some or all of the nodes may be compatible with each other, the various entities may use their own proprietary protocols, hardware, and/or software to implement the nodes. Thus, the processes for deploying, accessing, and/or configuring various nodes may be different.

To simplify the deployment, access, and/or configuration of various nodes, the nodes can instead be implemented in a virtualized network environment, such as by using network function virtualization (NFV). For example, instead of deploying in the core network custom hardware devices for each node, one or more physical computing devices in the core network can host one or more virtual machine instances that are each configured to operate as an independent computing device and perform the functionality of a node. The physical computing device(s) may have a sufficient amount of computing resources (e.g., disk space, central processing power, graphical processing power, memory, network bandwidth, internal bus capacity, etc.) to implement the virtual machine instance(s), where virtual computing resources are allocated to each of the virtual machine instance(s) to implement the functionality of a particular node. In some embodiments, the virtual machines may communicate with each other to form a virtual network and to provide communications services to UEs that access the core network.

By using NFV to implement core network node functionality in non-custom physical hardware device(s), the process for accessing such nodes can be standardized. For example, when custom hardware devices are deployed in the core network, each hardware device may provide a different mechanism for logging into the device. In particular, a different password or token may be needed to access each custom hardware device. However, this may not be necessary for nodes implemented using NFV. Because a single entity (e.g., a single network provider) may control the physical hardware device(s) used to run the virtual machine instances that implement various nodes, the single entity can create a standardized or unified process for accessing each physical hardware device and/or virtual machine instance. In particular, a single password (or token or other authentication factor) can be used to access the physical hardware device(s) and/or virtual machine instance(s).

While the standardized process for accessing nodes implemented using NFV can reduce network downtimes (e.g., because a network administrator can access many different nodes using the same credentials), the standardized process for accessing nodes can also introduce new security issues that were not previously present. For example, in typical core networks in which custom hardware devices are deployed, if an unauthorized user (e.g., a hacker) managed to access a first hardware device implementing a first node, the unauthorized user likely would not be able to use the same methods to access a second hardware device implementing a second node. Accordingly, the potentially destructive consequences of an unauthorized user being able to access a node (e.g., a network outage, a compromise of user and/or network data, etc.) can be limited to one node or a small subset of nodes. As an illustrative example, if an unauthorized user managed to access a first node located in a small city of a large metropolitan area, a network outage may be limited to just that small city.

However, this may not be the case with nodes implemented using NFV. For example, if an unauthorized user managed to access a first virtual machine instance implementing a first node, the unauthorized user likely would be able to use the same methods (e.g., the same credentials) to access other virtual machine instances implementing other nodes. Thus, the unauthorized user could access a larger amount of user and/or network data, cause more widespread network outages, and/or the like. In core networks that use NFV, it therefore may be beneficial to provide a mechanism for detecting nodes that have been compromised and/or for taking actions to resolve situations in which nodes have been compromised to reduce the effects of network outages, compromised user and/or network data, and/or other consequences of unauthorized access.

Accordingly, described herein is an improved core network that includes a network resilience system that can detect NFV-implemented nodes that have been compromised and/or that are no longer operational, remove such nodes from the virtual network environment, and restart the removed nodes in a last-known good state. For example, the nodes can periodically transmit to the network resilience system a health status message that indicates whether the respective node is operational. If the network resilience system does not receive a health status message from a particular node after a threshold period of time, then the network resilience system can attempt to contact the node from which the health status message was not received. If no response is received from the node, the network resilience system may determine that the node is compromised or no longer operational. In response, the network resilience system can transmit a global command to all nodes requesting an acknowledgment (optionally including the initial node that did not provide a health status message). For those nodes that do not provide the network resilience system with an acknowledgment message, the network resilience system can delete such nodes from the virtual network environment (e.g., delete the virtual machine instances implementing these nodes), obtain a backup copy of each node (e.g., where a backup copy represents a last-known good state of a node), and restart each node using a respective backup copy.

In some embodiments, each node may further run an intrusion detection agent. The intrusion detection agent may run locally, attempting to identify any unauthorized access of the respective node, any unauthorized changes to node data, the presence of any malware, the presence of viruses, etc. The intrusion detection agents may periodically transmit intrusion data to the network resilience system, where the intrusion data includes a report generated by the intrusion detection agent identifying whether any security risks are detected (e.g., unauthorized access, unauthorized data changes, presence of malware, presence of viruses, etc.). If an intrusion detection agent of a node identifies a security risk (or no intrusion data is provided by the node after a threshold period of time), the network resilience system may perform some or all of the steps described above. For example, the network resilience system can optionally attempt to contact the node (e.g., if no intrusion data is received). If no response is received from the node, the network resilience system may determine that the node is compromised or no longer operational. In response, the network resilience system can transmit a global command to all nodes requesting an acknowledgment (optionally including the initial node that did not provide a health status message). For those nodes that do not provide the network resilience system with an acknowledgment message and/or for the node that identified the presence of a security risk, the network resilience system can delete such nodes from the virtual network environment (e.g., delete the virtual machine instances implementing these nodes), obtain a backup copy of each node, and restart each node using a respective backup copy.

In further embodiments, machine learning can supplement the functionality provided by the health status messages and the intrusion data and/or can be used in place of the health status check and/or the intrusion data check. For example, the network resilience system can train one or more machine learning models to detect anomalous node behavior. For example, the operational data of nodes (e.g., backup schedules, maintenance schedules, what types of data are modified and/or when, which users access particular nodes, when users access nodes, etc.) can be used as training data by the network resilience system to train the machine learning model(s). Once the machine learning model(s) is trained, the nodes can periodically transmit operational data to the network resilience system. The network resilience system can provide the operational data as inputs to the machine learning model(s), which then output results indicating whether the operational data corresponds to normal behavior or anomalous behavior (e.g., unauthorized access, unauthorized data changes, backups occurring at unusual times, access occurring during unusual times, such as during unscheduled maintenance, users who do not normally access a node accessing the node, etc.). If a machine learning model outputs a result indicating that the operational data provided by a node corresponds to anomalous behavior, then the network resilience system can delete or remove such node from the virtual network environment (e.g., delete the virtual machine instance implementing the node), obtain a backup copy of the node, and restart the node using the backup copy.

The foregoing aspects and many of the attendant advantages of this disclosure will become more readily appreciated as the same become better understood by reference to the following detailed description, when taken in conjunction with the accompanying drawings.

Example Compromised Node Detection Environment

FIG. 1 is a block diagram of an illustrative compromised node detection environment 100 in which a network resilience system 130 monitors various nodes 140 implemented in a virtual computing environment 135 within a core network 110, detecting when such nodes 140 may be compromised and taking corrective action. The environment 100 includes one or more UEs 102 that communicate with the core network 110 via an access network 120. The core network 110 includes the network resilience system 130 and the virtual computing environment 135.

The UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the UE 102 includes a wide variety of software and hardware components for establishing communications over one or more communication networks, including the access network 120, the core network 110, and/or other private or public networks. For example, the UE 102 may include a subscriber identification module (SIM) card (e.g., an integrated circuit that stores data to identify and authenticate a UE that communicates over a telecommunications network) and/or other component(s) that enable the UE 102 to communicate over the access network 120, the core network 110, and/or other private or public networks via a radio area network (RAN) and/or a wireless local area network (WLAN). The SIM card may be assigned to a particular user account.

The UEs 102 are communicatively connected to the core network 110 via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102 to communicate via the fixed-location transceivers. Although the access network 120 is illustrated as a single network, one skilled in the relevant art will appreciate that the access network can include any number of public or private communication networks and/or network connections.

The core network 110 provides various services to UEs 102 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include a call routing system (embodied as one or more nodes 140), which routes telephone calls, messages, and/or other data across a PSTN or IMS. The core network 110 may provide high capacity communication facilities that connect various nodes implemented on one or more computing devices, allowing the nodes to exchange information via various paths.

As described above, the core network 110 may include the virtual computing environment 135, which may be implemented by one or more physical computing devices that have one or more processors, memory, network interface(s), graphics processor(s), etc. The one or more physical computing devices may host virtual machine instances that each implement a node 140. The physical computing device(s) and/or the virtual machine instance(s) may be located in the same geographic or logical region and/or in different geographic or logical regions. Nodes 140 (e.g., the virtual machine instances on which the nodes 140 are implemented) may communicate with each other to process a request originating from a first UE 102 and terminating at a second UE 102. For example, a request can correspond to one of several services, such as a file transfer service, voice call service, call waiting service, conference call service, video chat service, short message service (SMS), etc. In the example of an IMS, a node 140 may be a session border controller (SBC), a breakout gateway control function (BGCF), a media gateway controller function (MGCF), a home subscriber server (HSS), an interrogating call session control function (I-CSCF), a serving call session control function (S-CSCF), and/or the like. However, this is not meant to be limiting. The nodes 140 can be any component in any type of network or system that routes requests over various components (e.g., a visitor location register (VLR), a serving general packet radio service (GPRS) support node (SGSN), a mobility management entity (MME), an access network, a network that provides an interface between two different service providers, a network-enabled server or computing system that includes various load balancers and/or firewalls, etc.), and the techniques described herein can be applied to any such type of network or system to identify and resolve security issues.

As illustrated in FIG. 1, the network resilience system 130 may include several components, such as a node health manager 131, an intrusion detection system 132, a machine learning (ML) anomaly detector 133, and a node restore manager 134. In an embodiment, the node health manager 131 can obtain health status messages periodically transmitted by the nodes 140. For example, the nodes 140 may be configured to periodically generate health status messages and transmit the health status messages to the node health manager 131. A health status message may indicate whether a node 140 is operational. If the node health manager 131 does not receive a health status message from a particular node 140 after a threshold period of time (or if the health status message indicates that the node 140 is not operational), then the node health manager 131 can notify the node restore manager 134 accordingly.

In response to receiving an indication from the node health manager 131 that a node 140 did not transmit a health status message (or that the node 140 is not operational as indicated by the health status message), then the node restore manager 134 can attempt to contact the node 140. If no response is received from the node 140 within a threshold period of time, the node restore manager 134 may determine that the node 140 is compromised and/or no longer operational. In response, the node restore manager 134 can transmit a global command to some or all nodes 140 requesting an acknowledgment (optionally including the initial node 140 that did not provide a health status message or that provided a health status message indicating that the node 140 is not operational). If the node restore manager 134 receives acknowledgement messages from each of the nodes 140 from which an acknowledgment was requested, then the node restore manager 134 can initiate a restart operation with respect to the node 140 that is deemed compromised or non-operational. Otherwise, if the node restore manager 134 does not receive an acknowledgement message from one or more nodes 140 from which an acknowledgment was requested (e.g., indicating that these nodes 140 may also be compromised or non-operational), then the node restore manager 134 can initiate a restart operation with respect to the node 140 that is deemed compromised or non-operational and the node(s) 140 that did not respond to the acknowledgement request.

In the restart operation, the node restore manager 134 can decommission the node 140 that is deemed compromised or non-operational and/or the node(s) 140 that did not respond to the acknowledgment request. For example, decommissioning a node 140 can include the node restore manager 134 identifying a last-known good state of the node 140 (e.g., a backup copy of the node 140) and obtaining the last-known good state of the node 140 from a data store (internal or external to the core network 110, not shown). In some embodiments, a separate device internal or external to the core network 110 (not shown) or the virtual computing environment 135 itself may periodically backup the virtual machine instances that host the various nodes 140. During the backup process, the separate device or the virtual computing environment 135 can run diagnostics on a backup copy to ensure the backup copy is valid and does not include any malware, viruses, or other malicious code. If the diagnostic clears, then the separate device or the virtual computing environment 135 can store the backup in the data store in an entry associated with the node 140 that was backed up. If the diagnostic does not clear for a reason other than that the backup includes malware, viruses, or other malicious code (e.g., the backup data is corrupted), then the separate device or the virtual computing environment 135 may obtain a backup copy of a neighbor virtual machine instance (e.g., a virtual machine instance that hosts a node 140 that performs the same services or operations as the node 140 to be backed up, but that may be located in a different geographic or logical region) and store the backup of the neighbor virtual machine instance in the data store in an entry associated with the node 140 to be backed up. Thus, the backup copies stored in the data store are known to be backups of operational, non-compromised versions of the nodes 140. The node restore manager 134 can then obtain the most-recent backup from the data store during the node 140 decommission.

Before, during, or after obtaining the most recent backup copy of the node 140 that is deemed compromised or non-operational and/or of the node(s) 140 that did not respond to the acknowledgment request, the node restore manager 134 can delete, from the virtual computing environment 135, the node 140 that is deemed compromised or non-operational and/or of the node(s) 140 that did not respond to the acknowledgment request (e.g., delete the corresponding virtual machine instances). Once deleted, the node restore manager 134 can restart the deleted nodes 140 using the obtained backup copies (e.g., restore a virtual machine instance that hosts the node 140 that is deemed compromised or non-operational using a backup copy and/or restore virtual machine instance(s) that host the node(s) 140 that did not respond to the acknowledgment request using respective backup copies). A backup copy may be an image of a virtual machine instance, and restarting a deleted node 140 can include replacing the image of the virtual machine instance that implemented the now-deleted node 140 with the backup copy image or can include starting a new virtual machine instance different from the virtual machine instance that implemented the now-deleted node 140 using the backup copy image. Alternatively, instead of or in addition to obtaining backup copies, the node restore manager 134 can restart the deleted nodes 140 using virtual machine template files (e.g., generic files that may not include network provider-specific configuration data, but that, when executed to form a virtual machine instance, implement the functionality of the deleted nodes 140). In addition, the node restore manager 134 may require a network administrator to enter different, unique passwords for each of the restarted nodes 140, may restrict what types of users can access the restarted nodes 140, may restrict what types of actions can be performed within the restarted nodes 140 (e.g., set restrictions that prevent the modification of node 140 parameters, set restrictions on which users can update node 140 software, etc.), and/or the like. Thus, the node restore manager 134 can remove a compromised or non-operational node 140 from the core network 110, replacing the compromised or non-operational version of the node 140 with a non-compromised, operational version of the node 140.

The intrusion detection system 132 can use intrusion data to indicate to the node restore manager 134 on which node(s) 140 restart operations should take place. For example, each node 140 may run an intrusion detection agent 142. In particular, the operating system running within each virtual machine instance may run the intrusion detection agent 142. The intrusion detection agent 142 may monitor reads, writes, and/or other operations that occur within the virtual machine instance in an attempt to identify any unauthorized access of the node 140 implemented by the virtual machine instance, any unauthorized changes to node 140 data, the presence of any malware applications within the virtual machine instance, the presence of viruses within the virtual machine instance, the presence of other malicious code within the virtual machine instance, etc.

The intrusion detection agents 142 may periodically transmit intrusion data to the intrusion detection system 132, where the intrusion data includes a report generated by the intrusion detection agent 142 identifying whether any security risks are detected (e.g., unauthorized access, unauthorized data changes, presence of malware, presence of viruses, presence of other malicious code, etc.). If an intrusion detection agent 142 identifies a security risk (or no intrusion data is provided by the node 140 after a threshold period of time), the intrusion detection system 132 may instruct the node restore manager 134 to perform some or all of the operations described above.

For example, the intrusion detection system 132 can optionally instruct the node restore manager 134 to attempt to contact a node 140 (e.g., if no intrusion data is received from the node 140). If no response is received from the node 140, the node restore manager 134 may determine that the node 140 is compromised or no longer operational. In response, the node restore manager 134 can transmit a global command to some or all nodes 140 requesting an acknowledgment in a manner as described above. For the node 140 deemed to be compromised or non-operational and/or for those node(s) 140 that do not provide the node restore manager 134 with an acknowledgment message, the node restore manager 134 can then initiate the restart operations discussed above.

The ML anomaly detector 133 can train and use machine learning models to detect anomalous node 140 behavior. The ML anomaly detector 133 can use the machine learning models to supplement the functionality provided by the node health manager 131 and/or intrusion detection system 132 and/or can be used in place of the node health manager 131 and/or intrusion detection system 132. For example, the ML anomaly detector 133 can train one or more machine learning models to detect anomalous node 140 behavior using historical node 140 operational data (e.g., node 140 operational data obtained at a previous time). Node 140 operational data can be aggregated by the individual nodes 140 and transmitted periodically to the ML anomaly detector 133. The node 140 operational data can include backup schedules, maintenance schedules, data indicating what types of data are modified and/or when, data indicating which users access particular nodes 140, data indicating when users access nodes 140, etc.

Once the machine learning model(s) is trained, the ML anomaly detector 133 can obtain the operation data transmitted by the nodes 140 and provide the operational data as inputs to the machine learning model(s). As a result, the machine learning model(s) may output results indicating whether operational data for a particular node 140 corresponds to normal behavior or anomalous behavior (e.g., unauthorized access, unauthorized data changes, backups occurring at unusual times, access occurring during unusual times, such as during unscheduled maintenance, users who do not normally access a node 140 accessing the node 140, etc.). If a machine learning model outputs a result indicating that the operational data provided by a node 140 corresponds to anomalous behavior, then the ML anomaly detector 133 can instruct the node restore manager 134 to initiate restart operations with respect to that node 140 in a manner as discussed above.

In some embodiments, the node health manager 131, the intrusion detection system 132, and the ML anomaly detector 133 work in conjunction to identify compromised or non-operational nodes 140. In other embodiments, one or more of, but not all of, the node health manager 131, the intrusion detection system 132, and the ML anomaly detector 133 are implemented to identify compromised or non-operational nodes 140. If the node health manager 131 is not implemented, then the nodes 140 may not be configured to transmit health status messages. Likewise, if the intrusion detection system 132 is not implemented, then the nodes 140 may not be configured with intrusion detection agents 142 and/or to transmit intrusion data, and if the ML anomaly detector 133 is not implemented, then the nodes 140 may not be configured to transmit operational data.

The network resilience system 130 may be a single computing device or may include multiple distinct computing devices, such as computer servers, logically or physically grouped together to collectively operate as a server system. The components of the network resilience system 130 can each be implemented in application-specific hardware (e.g., a server computing device with one or more ASICs) such that no software is necessary, or as a combination of hardware and software. In addition, the modules and components of the network resilience system 130 can be combined on one server computing device or separated individually or into groups on several server computing devices. In some embodiments, the network resilience system 130 may include additional or fewer components than illustrated in FIG. 1.

Example Block Diagrams for Restarting a Compromised or Non-Operational Node

Figure 2:
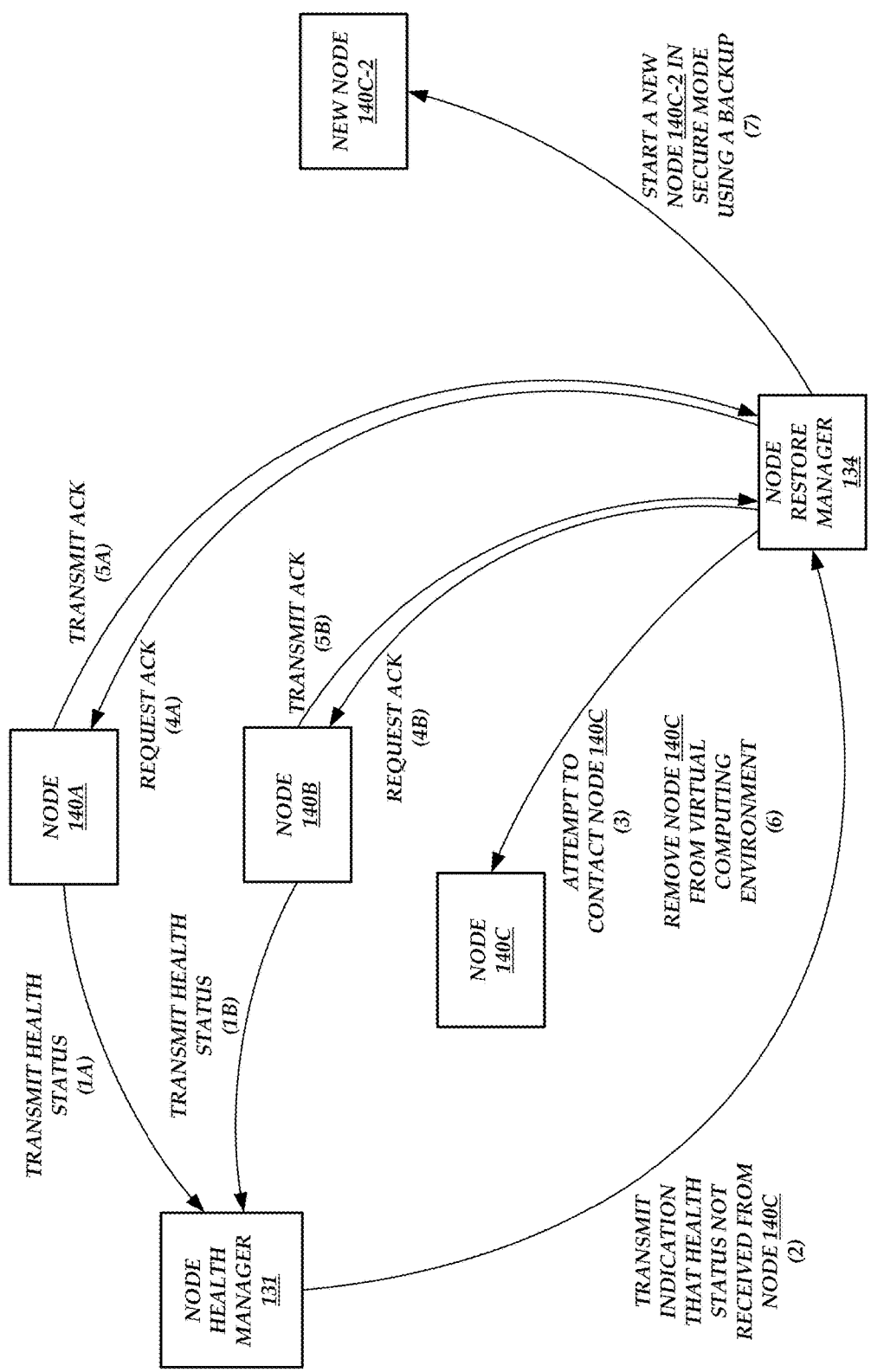
FIG. 2 is a block diagram of the compromised node detection environment of FIG. 1 illustrating the operations performed by the components of the compromised node detection environment to restart a compromised or non-operational node, according to one embodiment.

FIG. 2 is a block diagram of the compromised node detection environment 100 of FIG. 1 illustrating the operations performed by the components of the compromised node detection environment 100 to restart a compromised or non-operational node 140, according to one embodiment. As illustrated in FIG. 2, node 140A transmits a health status message to the node health manager 131 at (1A) and the node 140B transmits a health status message to the node health manager 131 at (1B). In an embodiment, both health status messages indicate that the respective node 140A-140B is healthy and operational. However, node 140C fails to transmit a health status message to the node health manager 131.

Because the node 140C fails to transmit a health status message to the node health manager 131, the node health manager 131 transmits to the node restore manager 134 an indication that a health status was not received from the node 140C at (2). The node restore manager 134 then attempts to contact the node 140C at (3). However, in an embodiment, the node restore manager 134 is unable to contact (e.g., does not receive a reply from) the node 140C.

Because a re-initialization of contact with the node 140C failed, the node restore manager 134 requests node 140A provide an acknowledgement at (4A) and requests node 140B provide an acknowledgement at (4B). In further embodiments, not shown, the node restore manager 134 also requests node 140C provide an acknowledgement. In response, node 140A transmits an acknowledgement to the node restore manager 134 at (5A) and node 140B transmits an acknowledgement to the node restore manager 134 at (5B). Thus, the node restore manager 134 determines that nodes 140A and 140B are not compromised and/or are operational.

The node restore manager 134 then begins the decommission process and removes node 140C from the virtual computing environment 135 at (6). For example, the node restore manager 134 can delete the virtual machine instance that implements the node 140C (e.g., release computing resources allocated to the virtual machine instance that implements the node 140C). The node restore manager 134 can then use a previous backup of the node 140C to start a new node 140C-2 at (7). For example, the node restore manager 134 can use the most recent backup of the virtual machine instance implementing the node 140C to instantiate a new virtual machine instance that implements the node 140C-2. The node 140C-2 may then perform the same operations as the node 140C. In an embodiment, the node restore manager 134 can start the new node 140C-2 in a secure mode, which restricts the type of users that can access the node 140C-2, the changes that can be made to the node 140C-2, etc.

If, for example, node 140A did not transmit an acknowledgment at (5A), then the node restore manager 134 may perform steps (6) and (7) for node 140A in order to start a new node 140A-2. Similarly, if node 140B did not transmit an acknowledgement at (5B), then the node restore manager 134 may perform steps (6) and (7) for node 140B in order to start a new node 140B-2.

Figure 3:
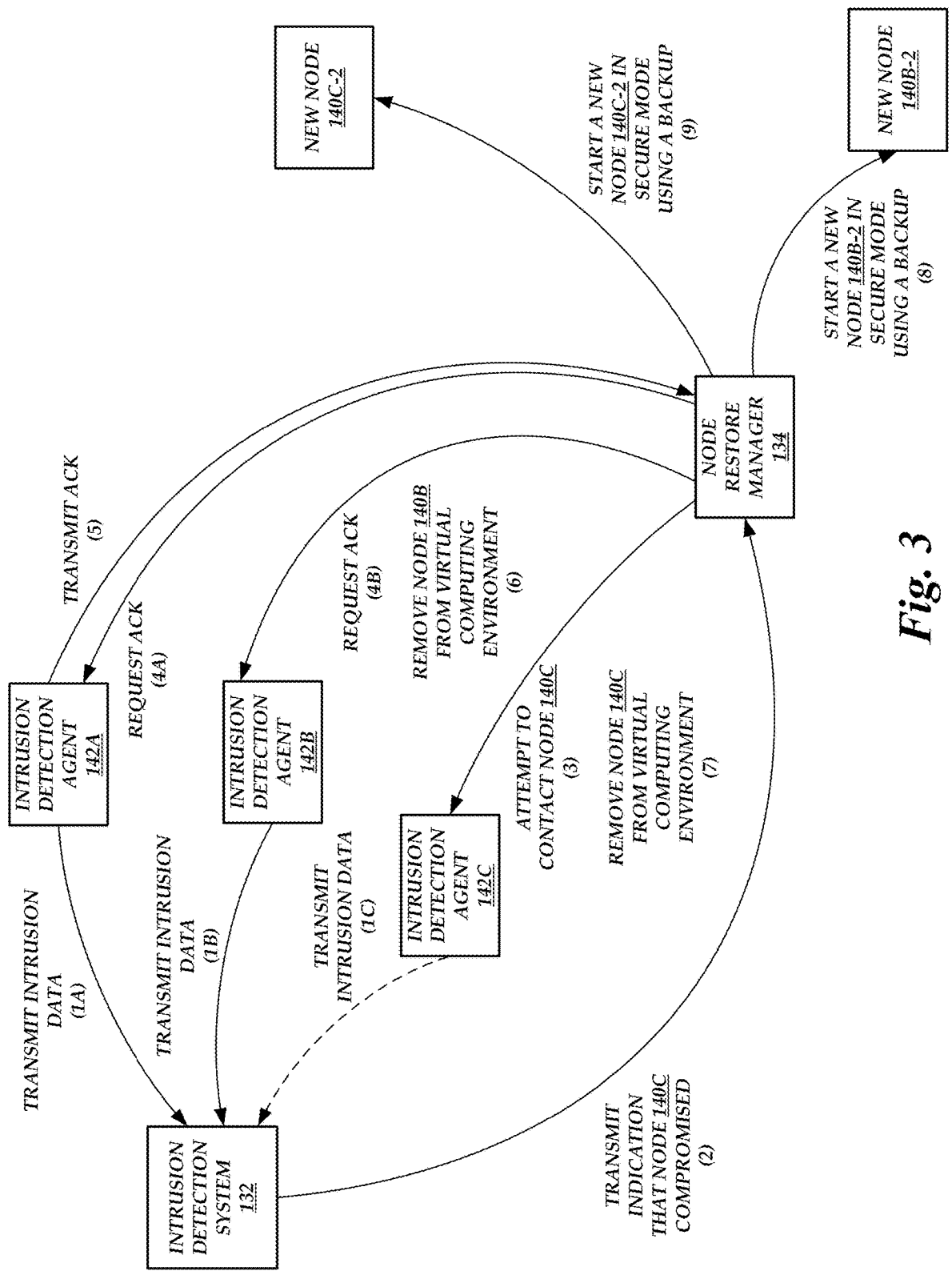
FIG. 3 is another block diagram of the compromised node detection environment of FIG. 1 illustrating the operations performed by the components of the compromised node detection environment to restart a compromised or non-operational node, according to one embodiment.

FIG. 3 is another block diagram of the compromised node detection environment 100 of FIG. 1 illustrating the operations performed by the components of the compromised node detection environment 100 to restart a compromised or non-operational node 140, according to one embodiment. As illustrated in FIG. 3, intrusion detection agent 142A transmits intrusion data to the intrusion detection system 132 at (1A) and the intrusion detection agent 142B transmits intrusion data to the intrusion detection system 132 at (1B). Optionally, the intrusion detection agent 142C transmits intrusion data to the intrusion detection system 132 at (1C). In an embodiment, intrusion data from intrusion detection agents 142A and 142B indicate that the respective nodes 140A and 140B are healthy and operational. In embodiments in which the intrusion detection agent 142C does not transmit intrusion data, the intrusion detection system 132 determines that the node 140C on which the intrusion detection agent 142C runs is compromised and/or non-operational. In embodiments in which the intrusion detection agent 142C does transmit intrusion data, the intrusion data indicates that the node 140C on which the intrusion detection agent 142C runs is compromised with malware, viruses, other malicious code, unauthorized access, and/or the like.

Because the node 140C is compromised and/or non-operational, the intrusion detection system 132 transmits to the node restore manager 134 an indication that the node 140C is compromised (and/or non-operational) at (2). In embodiments in which the intrusion detection agent 142C does not provide intrusion data, the node restore manager 134 then attempts to contact the intrusion detection agent 142C at (3). However, in an embodiment, the node restore manager 134 is unable to contact (e.g., does not receive a reply from) the intrusion detection agent 142C.

In embodiments in which the intrusion detection agent 142C does not provide intrusion data, the node restore manager 134 requests intrusion detection agent 142A provide an acknowledgement at (4A) and requests intrusion detection agent 142B provide an acknowledgement at (4B). In further embodiments, not shown, the node restore manager 134 also requests intrusion detection agent 142C provide an acknowledgement. In response, intrusion detection agent 142A transmits an acknowledgement to the node restore manager 134 at (5). However, intrusion detection agent 142B does not transmit an acknowledgement to the node restore manager 134. Thus, the node restore manager 134 determines that node 140A is not compromised and/or is operational, and that node 140B is compromised and/or non-operational.

The node restore manager 134 then begins the decommission process, removing node 140B from the virtual computing environment 135 at (6) and removing node 140C from the virtual computing environment 135 at (7). For example, the node restore manager 134 can delete the virtual machine instances that implement the nodes 140B and 140C. The node restore manager 134 can then use a previous backup of the node 140B to start a new node 140B-2 at (8), and can use a previous backup of the node 140C to start a new node 140C-2 at (9). For example, the node restore manager 134 can use the most recent backup of the virtual machine instances implementing the nodes 140B and 140C to instantiate new virtual machine instances that implement the nodes 140B-2 and 140C-2. In an embodiment, the node restore manager 134 can start the new nodes 140B-2 and/or 140C-2 in the secure mode.

Figure 4:
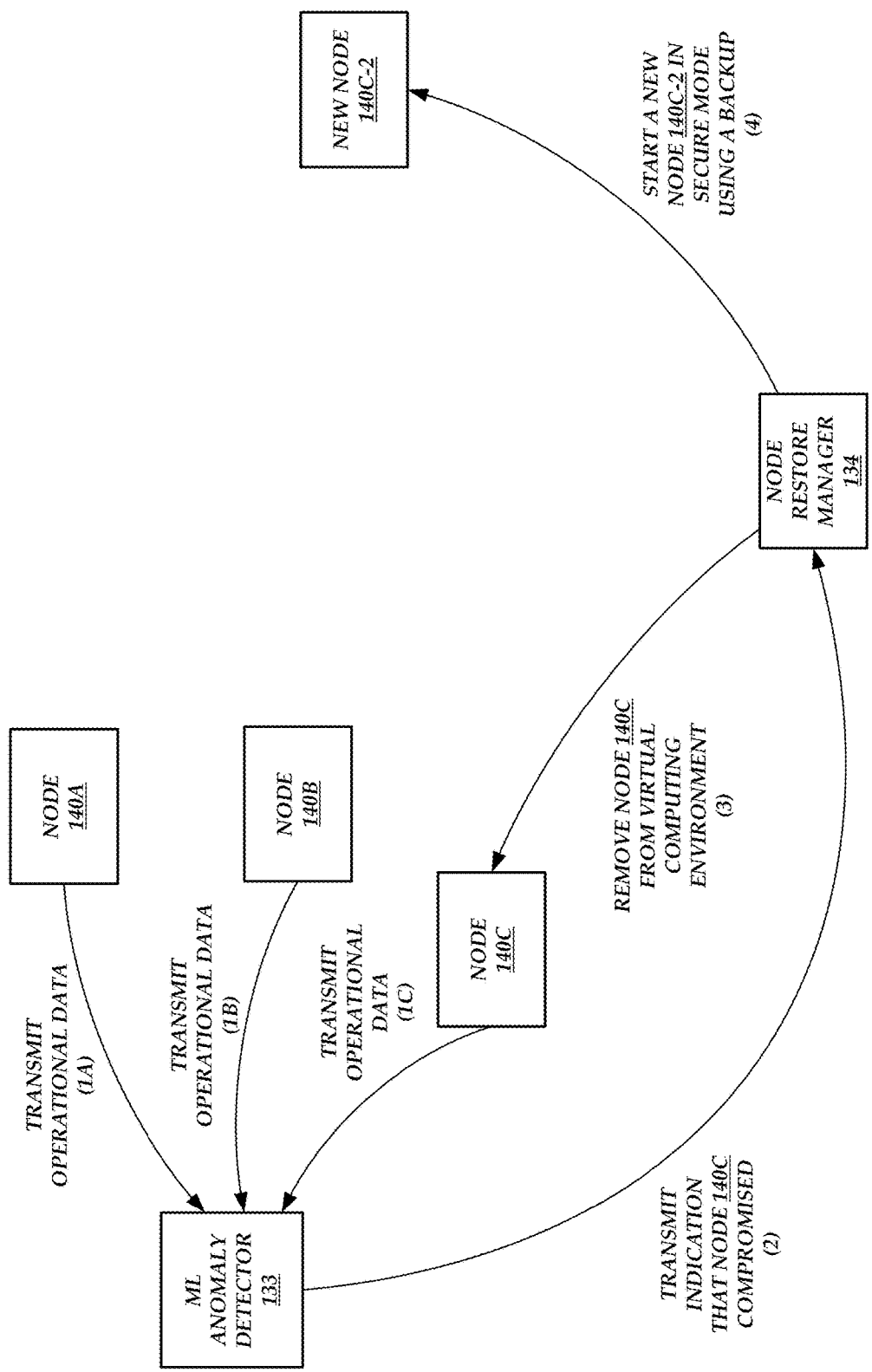
FIG. 4 is another block diagram of the compromised node detection environment of FIG. 1 illustrating the operations performed by the components of the compromised node detection environment to restart a compromised or non-operational node, according to one embodiment.

FIG. 4 is another block diagram of the compromised node detection environment 100 of FIG. 1 illustrating the operations performed by the components of the compromised node detection environment 100 to restart a compromised or non-operational node 140, according to one embodiment. As illustrated in FIG. 4, node 140A transmits operational data to the ML anomaly detector 133 at (1A), the node 140B transmits operational data to the ML anomaly detector 133 at (1B), and the node 140C transmits operational data to the ML anomaly detector 133 at (1C). The ML anomaly detector 133 can then apply individual operational data as inputs to a machine learning model that outputs an indication of whether the respective node 140A-140C is exhibit normal or anomalous behavior. In an embodiment, the machine learning model, when provided with operational data from nodes 140A and 140B as an input, indicates that both nodes 140A and 140B are exhibiting normal behavior. However, the machine learning model, when provided with operational data from node 140C as an input, indicates that node 140C is exhibiting anomalous behavior.

The ML anomaly detector 133 accordingly transmits to the node restore manager 134 an indication that the node 140C is compromised at (2) given that the machine learning model predicts that the node 140C is exhibiting anomalous behavior. The node restore manager 134 then begins the decommission process and removes node 140C from the virtual computing environment 135 at (3). The node restore manager 134 can then use a previous backup of the node 140C to start a new node 140C-2 at (4). In an embodiment, the node restore manager 134 can start the new node 140C-2 in the secure mode.

In an embodiment, the operations depicted in FIGS. 2, 3, and 4 can be performed in parallel, in sequence, and/or any combination thereof. The operations depicted in FIGS. 2, 3, and 4 are each optional, meaning that, in a particular embodiment, the operations depicted in FIG. 2 are performed, the operations depicted in FIG. 3 are performed, and/or the operations depicted in FIG. 4 are performed.

Example Compromised Node Detection Routine

Figure 5:
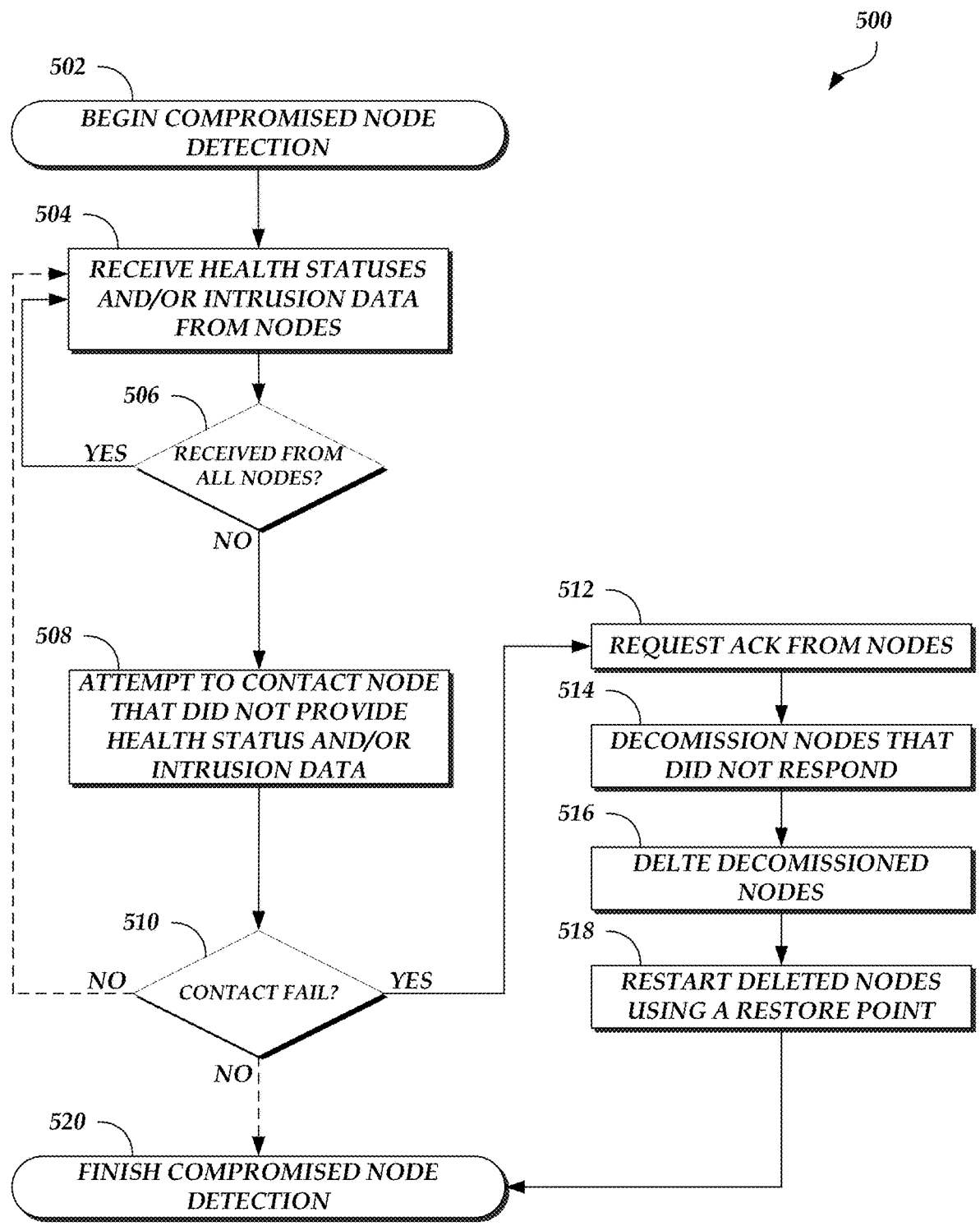
FIG. 5 is a flow diagram depicting a compromised node detection routine illustratively implemented by a network resilience system, according to one embodiment.

FIG. 5 is a flow diagram depicting a compromised node detection routine 500 illustratively implemented by a network resilience system, according to one embodiment. As an example, the network resilience system 130 of FIG. 1 can be configured to execute the compromised node detection routine 500. The compromised node detection routine 500 begins at block 502.

At block 504, health statuses and/or intrusion data are received from nodes. For example, health status messages and/or intrusion data may be transmitted periodically by nodes implemented within virtual machine instances hosted in a virtual computing environment in a core network.

At block 506, a determination is made as to whether health status and/or intrusion data are received from all nodes. If health status and/or intrusion data are received from all nodes, this may indicate that no compromised and/or non-operational nodes are detected and the compromised node detection routine 500 returns to block 504 so that the next set of health status messages and/or intrusion data can be received at a later time for evaluation. However, if health status and/or intrusion data are not received from all nodes, this may indicate that one or more nodes is compromised and/or non-operational and the compromised node detection routine 500 proceeds to block 508.

At block 508, an attempt to contact a node that did not provide a health status and/or intrusion data is made. For example, a message may be sent to the node requesting the node to provide a reply or acknowledgment that the message is received.

At block 510, a determination is made as to whether the attempt to contact the node failed. If the attempt failed (e.g., the node did not respond to the request for a reply or acknowledgment within a threshold period of time), this may confirm that the node is compromised and/or non-operational and the compromised node detection routine 500 proceeds to block 512. Otherwise, if the attempt succeeded, this may confirm that a connection issue caused the node to not provide the health status and/or intrusion data and the compromised node detection routine 500 can either revert back to block 504 or proceed to block 520 and end.

At block 512, an acknowledgment is requested from some or all of the nodes. For example, an acknowledgment may be requested to confirm that the acknowledgement request was received, which may confirm that a connection from the network resilience system to the nodes is established and operational. This step may be optional.

At block 514, any nodes that did not respond to the acknowledgement request, including the node that did not provide a health status and/or intrusion data, are decommissioned. For example, the most recent backup copies of these nodes may be obtained for use as a restore point.

At block 516, the decommissioned nodes are deleted. For example, the network resilience system may instruct the virtual computing environment to delete the virtual machine instances implementing the decommissioned nodes.

At block 518, the deleted nodes are restarted using the respective restore point. For example, the obtained most recent backup copies can be used to instantiate new virtual machine instances that implement restored versions of the deleted nodes. After the deleted nodes are restarted, the compromised node detection routine 500 ends, as shown at block 520.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
determining that a node implemented by a virtual machine instance running on a physical computing device in a core network is non-responsive;
removing the virtual machine instance that implements the node;

initiating a restored version of the virtual machine instance that implements the node in response to the virtual machine instance being removed; and preventing a first type of user allowed to access the node implemented by the virtual machine instance from accessing the node implemented by the restored version of the virtual machine instance.

2. The computer-implemented method of claim 1, further comprising:

obtaining intrusion data from the node implemented by the virtual machine instance; and determining that the intrusion data obtained from the node implemented by the virtual machine instance indicates that a security risk is detected in the node implemented by the virtual machine instance.

3. The computer-implemented method of claim 2, wherein the security risk comprises at least one of unauthorized access to the node implemented by the virtual machine instance, unauthorized data changes in the node implemented by the virtual machine instance, a presence of malware in the node implemented by the virtual machine instance, a presence of a virus in the node implemented by the virtual machine instance, or a presence of other malicious code in the node implemented by the virtual machine instance.

4. The computer-implemented method of claim 1, further comprising determining that the node implemented by the virtual machine instance has not provided intrusion data.

5. The computer-implemented method of claim 1, further comprising:

obtaining operational data from the node implemented by the virtual machine instance;

applying the operational data as an input to a machine learning model to produce a result; and determining that the result indicates that the node implemented by the virtual machine instance is exhibiting anomalous behavior.

6. The computer-implemented method of claim 5, wherein the anomalous behavior comprises at least one of unauthorized access to the node implemented by the virtual machine instance, unauthorized data changes in the node implemented by the virtual machine instance, a backup of the node implemented by the virtual machine instance occurring during an unusual time, or access to the node implemented by the virtual machine instance occurring during an unusual time.

7. The computer-implemented method of claim 5, further comprising training the machine learning model using historical operational data obtained from a plurality of nodes.

8. The computer-implemented method of claim 5, wherein the operational data comprises at least one of a backup schedule, a maintenance schedule, data indicating what types of data are modified, data indicating when the types of data are modified, data indicating which users access the node implemented by the virtual machine instance, or data indicating when the users access the node implemented by the virtual machine instance.

9. The computer-implemented method of claim 1, wherein the restored version of the virtual machine instance comprises a most recent backup copy of the virtual machine instance.

10. The computer-implemented method of claim 1, wherein the node implemented by the virtual machine instance comprises one of a session border controller (SBC), a breakout gateway control function (BGCF), a media gateway controller function (MGCF), a home subscriber server (HSS), an interrogating call session control function (I-CSCF), or a serving call session control function (S-CSCF).

11. Non-transitory, computer-readable storage media comprising computer-executable instructions, wherein the computer-executable instructions, when executed by a computer system, cause the computer system to:

determine that a node implemented by a virtual machine instance running on a physical computing device in a core network is non-responsive;

remove the virtual machine instance that implements the node;

initiate a restored version of the virtual machine instance that implements the node in response to the virtual machine instance being removed; and prevent a first type of user allowed to access the node implemented by the virtual machine instance from accessing the node implemented by the restored version of the virtual machine instance.

12. The non-transitory, computer-readable storage media of claim 11, wherein the computer-executable instructions further cause the computer system to:

obtain intrusion data from the node implemented by the virtual machine instance; and determine that the intrusion data obtained from the node implemented by the virtual machine instance indicates that a security risk is detected in the node implemented by the virtual machine instance.

13. The non-transitory, computer-readable storage media of claim 11, wherein the computer-executable instructions further cause the computer system to determine that the node implemented by the virtual machine instance has not provided intrusion data.

14. The non-transitory, computer-readable storage media of claim 11, wherein the computer-executable instructions further cause the computer system to:

obtain operational data from the node implemented by the virtual machine instance;

apply the operational data as an input to a machine learning model to produce a result; and determine that the result indicates that the node implemented by the virtual machine instance is exhibiting anomalous behavior.

15. The non-transitory, computer-readable storage media of claim 14, wherein the computer-executable instructions further cause the computer system to train the machine learning model using historical operational data obtained from a plurality of nodes.

16. A core network comprising:

a physical computing device that hosts a virtual machine instance that implements a node of the core network; and a network system comprising a processor in communication with the physical computing device and configured with specific computer-executable instructions to:

determine that the node is non-responsive;

remove the virtual machine instance that implements the node;

initiate a restored version of the virtual machine instance that implements the node in response to the virtual machine instance being removed; and prevent a first type of user allowed to access the node implemented by the virtual machine instance from accessing the node implemented by the restored version of the virtual machine instance.

17. The core network of claim 16, wherein the network system is further configured with specific computer-executable instructions to:
- obtain intrusion data from the node implemented by the virtual machine instance; and
- determine that the intrusion data obtained from the node implemented by the virtual machine instance indicates that a security risk is detected in the node implemented by the virtual machine instance.

18. The core network of claim 16, wherein the network system is further configured with specific computer-executable instructions to
- determine that the node implemented by the virtual machine instance has not provided intrusion data.

19. The core network of claim 16, wherein the network system is further configured with specific computer-executable instructions to:
- obtain operational data from the node implemented by the virtual machine instance;
- apply the operational data as an input to a machine learning model to produce a result; and
- determine that the result indicates that the node implemented by the virtual machine instance is exhibiting anomalous behavior.

20. The core network of claim 19, wherein the network system is further configured with specific computer-executable instructions to train the machine learning model using historical operational data obtained from a plurality of nodes.

* * * * *